(12) United States Patent
Konta

(10) Patent No.: US 8,545,136 B2
(45) Date of Patent: Oct. 1, 2013

(54) CUTTING INSERT

(75) Inventor: Shizue Konta, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 0 days.

(21) Appl. No.: 13/423,741

(22) Filed: Mar. 19, 2012

(65) Prior Publication Data

US 2012/0177452 A1    Jul. 12, 2012

Related U.S. Application Data

(63) Continuation of application No. PCT/JP2010/067460, filed on Oct. 5, 2010.

(30) Foreign Application Priority Data

Oct. 15, 2009    (JP) .................................. 2009-237854

(51) Int. Cl.
*B23B 27/22*    (2006.01)

(52) U.S. Cl.
CPC ...................................... *B23B 27/22* (2013.01)
USPC ........................................................ 407/114

(58) Field of Classification Search
USPC .......................... 407/100, 113, 114, 115, 116
IPC ....................................................... B23B 27/22
See application file for complete search history.

(56) References Cited

U.S. PATENT DOCUMENTS

| | | | | |
|---|---|---|---|---|
| 4,941,780 A | * | 7/1990 | Takahashi ...................... | 407/114 |
| 5,032,049 A | * | 7/1991 | Hessman et al. ............... | 407/113 |
| 5,193,947 A | * | 3/1993 | Bernadic et al. ............... | 407/114 |
| 5,222,843 A | * | 6/1993 | Katbi et al. .................... | 407/114 |
| 5,230,591 A | * | 7/1993 | Katbi et al. .................... | 407/114 |
| 5,947,651 A | * | 9/1999 | Murakami et al. ............. | 407/114 |
| 6,234,726 B1 | * | 5/2001 | Okada et al. ................... | 407/114 |
| 8,137,035 B2 | | 3/2012 | Uchijo et al. | |
| 2008/0219784 A1 | | 9/2008 | Yamazaki et al. | |

FOREIGN PATENT DOCUMENTS

| | | |
|---|---|---|
| CN | 1799736 A | 7/2006 |
| EP | 0494646 A1 * | 7/1992 |
| JP | 3-62708 | 6/1991 |

(Continued)

OTHER PUBLICATIONS

English machine translation of JP2004216510's abstract.*

(Continued)

*Primary Examiner* — Daniel Howell
*Assistant Examiner* — Alan Snyder
(74) *Attorney, Agent, or Firm* — Womble Carlyle

(57) ABSTRACT

A cutting insert enables a reduction in cutting resistance and stable cutting process. The insert includes a chip breaker groove formed inside corner cutting edges and a raised portion. The raised portion includes a top surface, a front raised surface, and side raised surfaces. The top surface intersects the front raised surface and each of the side raised surfaces. A first intersecting portion at which the front raised surface and the top surface intersect with each other extends linearly. A second intersecting portion at which each of the side raised surfaces and the top surface intersect with each other extends from a corresponding one of opposite sides of the first intersecting portion so that a distance from the corresponding side cutting edge increases gradually with a distance from the corner cutting edge. The front raised surface and the side raised surfaces are curved convexly outward.

18 Claims, 6 Drawing Sheets

(56) References Cited

FOREIGN PATENT DOCUMENTS

| JP | 5-053806 | | 7/1993 |
| --- | --- | --- | --- |
| JP | 6-190612 | | 7/1994 |
| JP | H10 217008 A | | 8/1998 |
| JP | 2004216510 A | * | 8/2004 |
| JP | 2008-000837 | | 1/2008 |
| JP | 2008-73827 | | 4/2008 |

OTHER PUBLICATIONS

Official Action dated Mar. 2, 2012 issued in Japanese counterpart application No. 2011-536106.

International Search Report in PCT/JP2010/067460, dated Nov. 22, 2010.

International Preliminary Report on Patentability (IPRP) dated Apr. 17, 2012 issued in PCT counterpart application (PCT/JP2010/067460).

Official Action dated Jun. 28, 2013 issued in Chinese counterpart application (No. 201080046401.0) with translation.

Search Report dated Jun. 28, 2013 issued in Chinese counterpart application (No. 201080046401.0) with translation.

* cited by examiner

CUTTING INSERT

CROSS-REFERENCE TO RELATED APPLICATIONS

This is a Continuation of International Application No. PCT/JP2010/067460, filed Oct. 5, 2010 and published as WO 2011/046045 on Apr. 4, 2011, which claims the benefit of Japanese Patent Application No. 2009-237854, filed Oct. 15, 2009. The contents of the above-identified applications are hereby incorporated by reference in their entirety.

BACKGROUND OF THE INVENTION

1. Field of the Invention

The present invention relates to a cutting insert installed in an indexable cutting tool.

2. Description of the Related Art

A cutting insert has been known which is shaped like a polygonal plate and which includes a cutting edge formed at an intersecting portion between an upper surface and each side surface of the cutting insert. To allow chips to be appropriately processed, the cutting insert includes a chip breaker groove formed between a central portion thereof and each corner cutting edge formed at a corresponding one of the corner portions of the upper surface, with a chip breaker projection provided in the chip breaker groove.

A cutting insert described in Japanese Patent Laid-Open No. H06-190612 (1994) is characterized by (a) including projecting portions each projecting from the central portion thereof into the chip breaker groove toward the corresponding corner cutting edge and protruding portions each projecting beyond the corresponding projecting portion toward the corresponding corner cutting edge and (b) in that an inclined raised portion is provided between the protruding portion and the chip breaker groove.

However, in the cutting insert described in Japanese Patent Laid-Open No. H06-190612 (1994), the raised portion of the protruding portion is a flat inclined surface, resulting in a large contact area between the raised portion and chips. This tends to increase cutting resistance (frictional resistance) between the chips and the cutting insert. Moreover, the cutting insert has a two-stage construction including the projecting portion projecting toward the corner cutting edge and the protruding portion projecting beyond the projecting portion toward the corner cutting edge. Thus, if an attempt is made, at a large depth of cut, to allow the chips to contact the projecting portion and thus to be curled, the protruding portion may excessively block the chips to increase the cutting resistance, depending on cutting conditions.

If the cutting insert in Japanese Patent Laid-Open No. H06-190612 (1994) is redesigned so as to operate effectively at a large depth of cut in order to cope with the above-described problem, then at a small depth of cut, the chips are insufficiently blocked and thus unstably curled.

SUMMARY OF THE INVENTION

The present invention provides a cutting insert formed of a plate-like member with a substantially polygonal outer shape and comprising a rake face formed on at least one of opposite surfaces of the plate-like member, a flank formed on a side surface extended between the opposite surfaces, and cutting edges each formed at an intersecting portion where the rake face and the flank cross each other, the cutting edge comprising corner cutting edges formed at respective corner portions of the opposite surface with the rake face formed thereon and side cutting edges formed along a pair of side edge portions extending on opposite sides of each of the corner cutting edges, the cutting insert being characterized in that a chip breaker groove formed in the opposite surface with the rake face formed thereon and inside the corner cutting edge comprises a raised portion raised upward from an interior of the chip breaker groove, the raised portion comprises a top surface comprising a top portion of the raised portion, a front raised surface facing the corner cutting edge and extended from the chip breaker groove to the top surface, and side raised portions arranged on opposite sides of the front raised portion, and the top surface crosses both the front raised surface and each of the side raised surfaces, and in that a first intersecting portion at which the front raised surface and the top surface cross each other is linearly extended, a second intersecting portion at which each of the side raised surfaces and the top surface cross each other is extended from a corresponding one of opposite sides of the first intersecting portion and comprises a portion for which a distance from the corresponding side cutting edge increases gradually with a distance from the corner cutting edge, the front raised surface is curved so as to protrude outward, and the side raised surfaces are each curved so as to protrude outward.

According to the above-described configuration, the front raised surface faces a leading end of the corresponding corner cutting edge and is extended from the chip breaker groove to the top surface, and the first intersecting portion where the front raised surface and the top surface cross each other is linearly extended. Thus, the front raised surface allows chips to be blocked and reliably controlled. Moreover, the chips contacting the front raised surface can be controllably passed in a given direction. This allows the chips contacting the front raised surface to be stably curled. Furthermore, the front raised surface is curved in a protrusive manner. Consequently, the chips contacting the front raised surface can be quickly separated from the front raised surface. This enables possible excessive contact between each of the front raised surfaces and the chips to be prevented. Hence, scatter of the chips can be suppressed, and cutting resistance can be reduced.

Furthermore, in the above-described configuration, the second intersecting portion at which each of the side raised surfaces and the top surface cross each other extends in a direction in which the second intersecting portion leaves the corresponding corner cutting edge, while being curved so as to protrude from the corresponding one of the opposite ends of the first intersecting portion, and the front raised surface is curved so as to protrude outward. Thus, the distance from each of the side cutting edges to the front raised surface increases consistently with a depth of cut. This enables the prevention mainly of the scatter of chips from the side cutting edges and an increase in cutting resistance.

Moreover, each of the side raised surfaces is curved so as to protrude outward, thus allowing the chips contacting the side raised surface to be quickly separated from the side raised surface. This enables possible excessive contact between each of the side raised surfaces and the chips to be prevented. Hence, the scatter of the chips can be suppressed, and the cutting resistance can further be reduced.

Preferably, the corner cutting edge is a round corner, and a length of the first intersecting portion is at least 0.05 mm and is set equal to or smaller than a radius of curvature of the corner cutting edge.

Preferably, a connection portion between the front raised surface and each of the side raised surfaces is curved so as to protrude toward the corresponding corner cutting edge.

Preferably, the radius of curvature of each of the side raised surfaces increases gradually with a distance from the corresponding corner cutting edge as seen in a cross section taken parallel to a straight line of the first intersecting portion and perpendicularly to the opposite surfaces.

Preferably, a difference in height between an uppermost position and a lowermost position of each of the side raised surfaces increases gradually with a distance from the corresponding corner cutting edge as seen in a cross section taken parallel to a straight line of the first intersecting portion and perpendicularly to the opposite surfaces.

Preferably, each of the side cutting edges comprises an inclined portion with a height decreasing gradually with a distance from the corresponding corner cutting edge.

The present invention enables stable chip processing and a reduction in cutting resistance under a wide range of cutting conditions for the depth of cut. At a small depth of cut, the front raised surface, which is wide, blocks and reliably controls the chips. Moreover, the chips contacting the front raised surface can be controllably passed in a constant direction. Thus, the chips contacting the front raised surface can be stably curled. Furthermore, at a large depth of cut, since the second intersecting portion at which each of the side raised surfaces and the top surface cross each other is extended in the direction in which the second intersecting portion leaves the corresponding corner cutting edge, while being curved so as to protrude from the corresponding end of the first intersecting portion. Thus, the distance from each of the side cutting edges to the corresponding side raised surface increases consistently with the depth of cut. This enables the prevention mainly of the scatter of chips from the side cutting edges and an increase in cutting resistance. Moreover, possible excessive contact between each of the side raised surfaces and the chips can be prevented. Therefore, the scatter of the chips can be suppressed, and the cutting resistance can further be reduced.

Further features of the present invention will become apparent from the following description of exemplary embodiments (with reference to the attached drawings).

DETAILED DESCRIPTION

Figure 1:
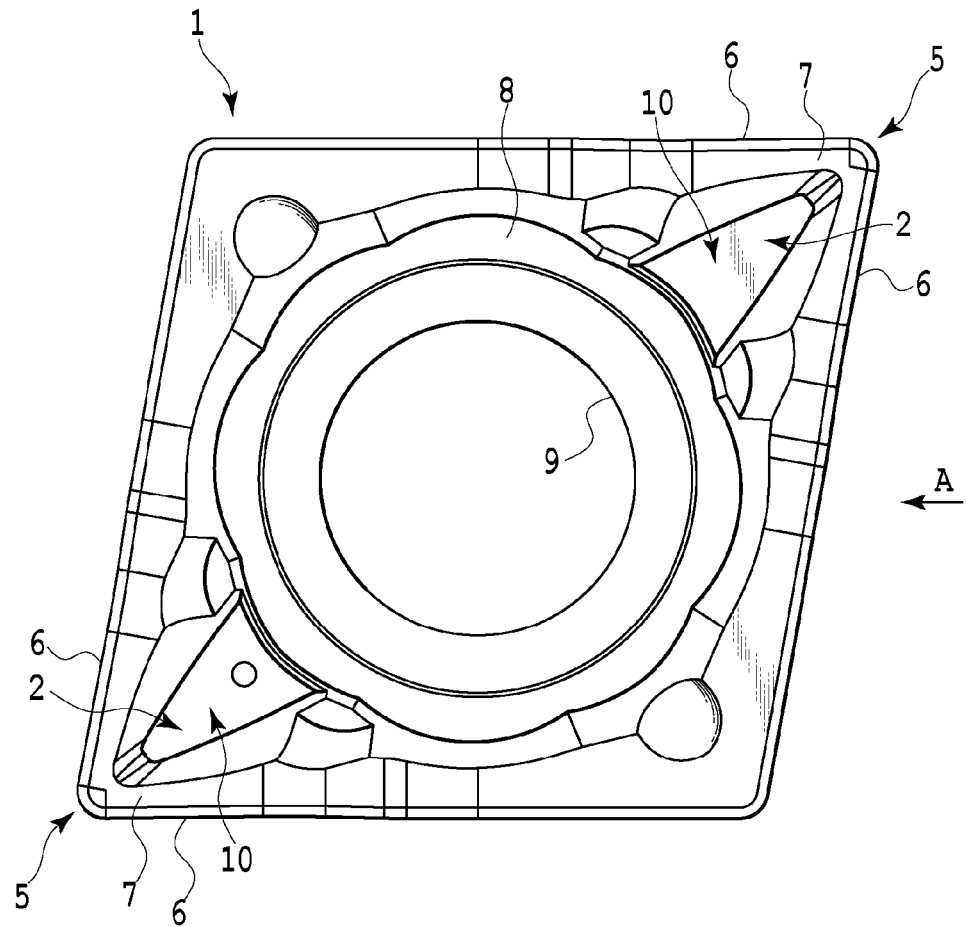
FIG. 1 is plan view of a cutting insert according to an embodiment of the present invention.
Figure 2:
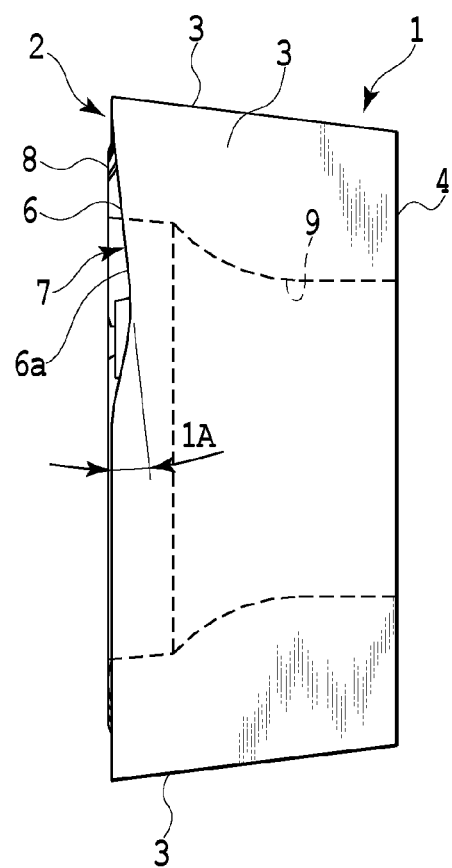
FIG. 2 is a side view of the cutting insert taken along line A in FIG. 1.

A cutting insert according to an embodiment of the present invention will be described below with reference to the drawings. As shown in FIG. 1 and FIG. 2, the cutting insert is a plate-like member with a substantially rhombic outer shape. A rake face 2 is formed on one of rhombic surfaces (opposite surfaces) of the cutting insert. The other rhombic surface serves as a seating face 4 that comes into abutting contact with a bottom surface of a tip seat provided on a tool body of a cutting tool. A flank 3 is formed on a plate-like side surface extending between the rake face 2 and the seating face 4. The flank 3 crosses one of the rhombic surfaces (rake face 2) so as to form an acute angle thereto, and has a positive flank angle.

The flank angle is set to at most about 20°. In the present embodiment, the flank angle is set to 7°. The flank angle of each flank may be set to 0°. In this case, the opposite rhombic surfaces cross the flanks 3 at right angles, and both rhombic surfaces can be made available by selectively using one of the rhombic surfaces as the rake face 2 and the other as the seating face 4. In the present embodiment, a circular arc corner cutting edge 5 is formed at a ridge portion of each of those corner portions of the cutting insert which form an acute angle. The circular arc forming the corner cutting edge 5 has a radius of curvature of 0.8 mm.

A side cutting edge 6 is formed along each side edge of the rhombic surface at which the rake face 2 and the flank 3 cross each other. The corner cutting edges 5 and side cutting edges 6 as a whole serve as a cutting edge for a workpiece.

As illustrated in FIG. 2, the side cutting edge 6 includes an inclined portion 6a with a height decreasing gradually with increasing distance from the corresponding corner cutting edge 5. In the present embodiment, the inclined portion 6a is linearly inclined as seen from the side surfaces of the insert and has a substantially constant inclination angle 1A. The inclination angle 1A can be set to, for example, at least about 2° and at most about 15°. In the present embodiment, the inclination angle is set to 6°. The inclination angle 1A may be varied depending on a position on the inclined portion 6 by, for example, forming the inclined portion 6a like a curved line or using a plurality of straight lines. Furthermore, if the inclined portion 6 is shaped like a curved line, the inclination angle 1A is defined by the average of the angles between a tangent and a horizontal line at the respective positions of the inclined portion 6a. Even if the inclined portion 6a is formed of a plurality of straight line portions with different inclinations, the inclination angle 1A is defined by the average of the angles between the tangent and the horizontal line at the respective positions of the inclined portion 6A. Even if the inclined portion 6a is formed of a plurality of linear portions with different inclinations, the inclination angle 1A is defined by the average of the inclinations.

The contour shape of the insert is not limited to a rhombus but may be changed to a substantial polygon such as a square, a rectangle, a rectangular parallelepiped, or a triangle. At least a part of the rake face 2, a part of the flank 3, and the corner cutting edges 5 and side cutting edges 6 are formed of a hard material such as cemented carbide, covered cemented carbide, cermet, or ceramic, or an extra-high-pressure sintered compact such as a diamond compact or a cubic boron nitride sintered compact.

In the present embodiment, a mounting hole 9 is formed in a central portion of the rhombic surface so as to penetrate both rhombic surfaces in the thickness direction of the cutting insert. The mounting hole need not necessarily be formed. A boss surface 8 is formed on the rhombic surface with the rake face 2 formed thereon and around the opening portion of the mounting hole 9. The boss surface 8 is a substantially flat surface slightly higher than the corner cutting edges 5 and side cutting edges 6.

A chip breaker groove 7 is formed in the rake face 2 at least inside the corner cutting edges 5, and includes a land L located on the corner cutting edges 5 and side cutting edges 6. The chip breaker groove 7 includes an inclined surface inclined such that the height of the chip breaker groove 7 decreases gradually with increasing distance from the corresponding corner cutting edge 5 and side cutting edges 6. The inclined surface provides a positive rake angle. The rake angle is preferably set to greater than 0° and at most 30°; in the present embodiment, the rake angle is set to 15°.

The land L may be formed in the chip breaker groove 7. The land L is formed of a conical surface or a flat surface extending along the cutting edges (corner cutting edges 5 and side cutting edges 6). The land L has a width of at least 0.02 mm and at most 0.50 mm in a direction perpendicular to the cutting edges; in the present embodiment the land L has a width of 0.15 mm. The land L may be a negative land extending in a horizontal direction as seen in a cross section taken orthogonally to the cutting edges, or a positive land inclined gently downward as the distance from the cutting edges increases, or a negative land inclined gently upward as the distance from the cutting edges increases. The inclination angle (land angle) of the positive land is set to, for example, greater than 0° and at most 20°; in the present embodiment, positive lands are formed to have an inclination angle (land angle) of 8°. Also for the upwardly inclined negative land, the inclination angle may be set to, for example, greater than 0° and at most 20°.

Figure 3:
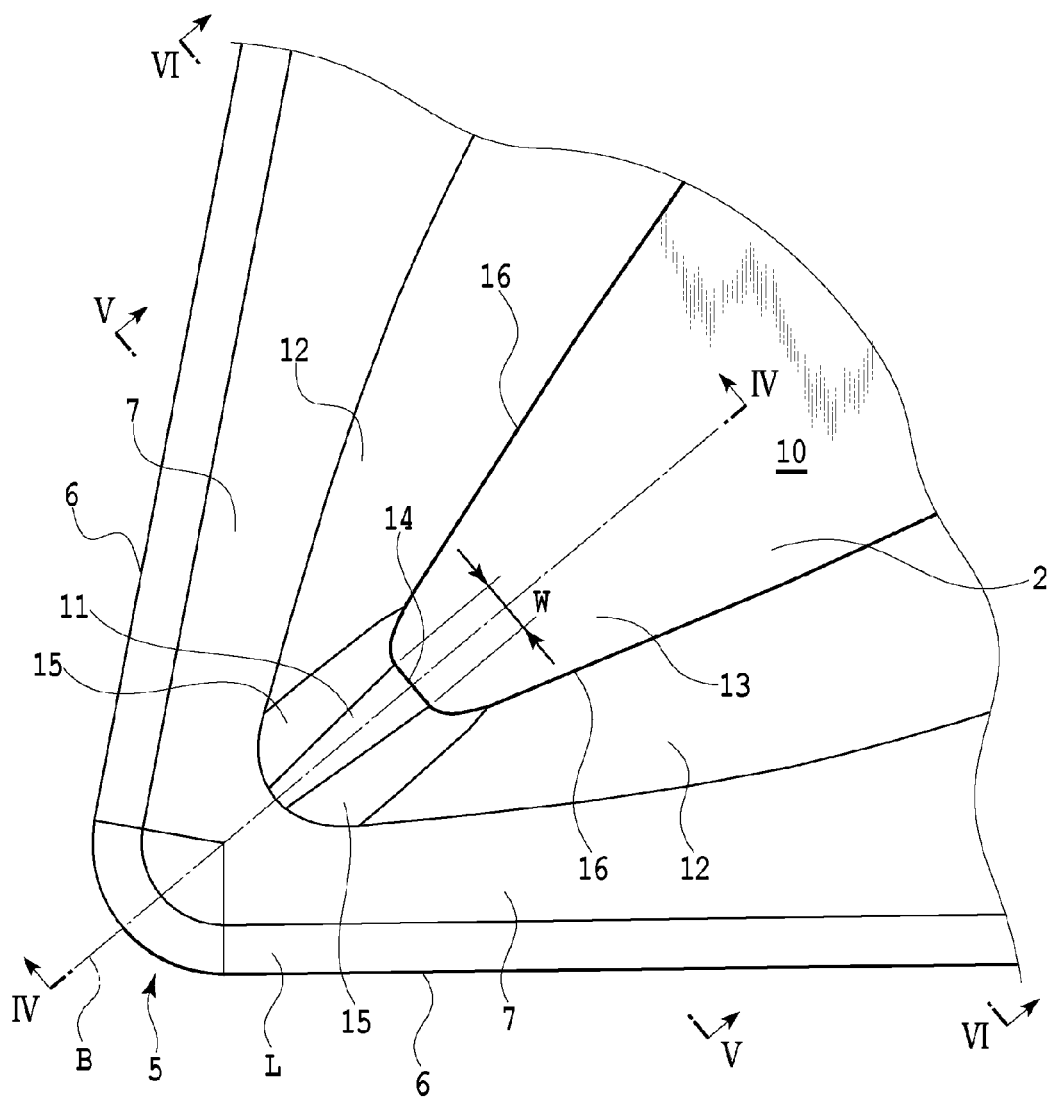
FIG. 3 is an enlarged plan view of an essential part of the cutting insert shown in FIG. 1.

As shown in FIG. 1 and FIG. 3, a raised portion 10 is formed which is raised upward from the interior of the chip breaker groove 7 formed inside the pair of corner cutting edges 5, as seen from a direction opposite to the rake face 2. The raised portion 10 extends along a bisector B of the pair of side cutting edges 6 extending from the corner portion and toward the corner cutting edge 5. The raised portion 10 includes a front raised surface 11, side raised surfaces 12, and transition surfaces 15, all of which rise upward from the chip breaker groove 7, and a top surface 13. The front raised surface 11 faces the corner cutting edge 5. Moreover, the front raised surface 11 faces a leading end of the corner cutting edge 5 defined by an intersection point between the corner cutting edge 5 and the bisector B. The side raised surfaces 12 are formed on the right and left sides of the front raised surface 11. Each of the side raised surfaces 12 includes a portion extending in a direction in which a distance from the corresponding side cutting edges 6 increase consistently with a distance from the corner cutting edge 5. In the present embodiment, the side raised surface 12 entirely extends in a direction in which the distance from the corresponding side cutting edge 6 increases. Each of the transition surfaces 15 is a curved surface with a small width which is formed at the intersection between the front raised surface 11 and the corresponding one of the side raised surfaces 12 and which is smoothly continuous with both raised surfaces 11 and 12 on the same tangent. The top surface 13 crosses the front raised surface 11 and the side raised surfaces 12. In the present embodiment, the top surface 13 is formed of a substantial plane extending in the horizontal direction. In a right/left hand cutting insert in which only one side cutting edge 6 of the pair of side cutting edges 6 extending from the corner cutting edge 5 serves as an active cutting edge, the front raised surface 12 may be provided exclusively on the side of the side cutting edge 6 serving to act on the front raised surface 11; this is not shown in the drawings.

As shown in FIG. 3, an intersecting portion 14 between the front raised surface 11 and top surface 13 of the raised portion 10 extends linearly parallel to a direction orthogonal to the bisector B. The length W of the intersecting portion 14 is equal to or smaller than the radius of curvature (0.8 mm) of the corner cutting edge 5. In the present embodiment, the length W is about 0.50 mm. The width of the front raised surface 11 may be constant regardless of a distance from the corner cutting edge 5 or may increase or decrease depending on a distance from the corner cutting edge 5.

In the present embodiment, the front raised surface 11 is formed to have a width increasing progressively with the distance from the corner cutting edge 5.

Figure 4:
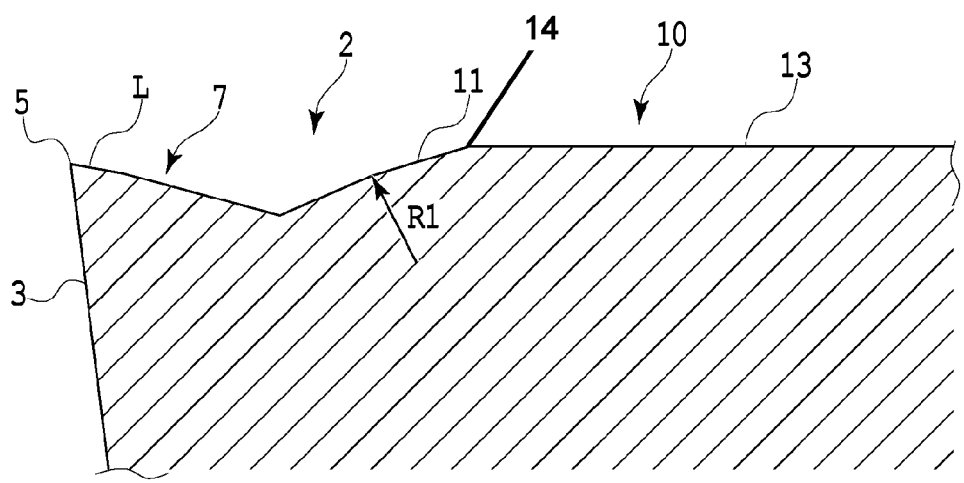
FIG. 4 is a cross-sectional view of the cutting insert taken along line IV-IV in FIG. 3.

On the other hand, as illustrated in FIG. 4, the front raised surface 11 is convexly curved so as to protrude upward and toward the corner cutting edge 5 (outward) as seen in a cross section taken along the bisector B. The radius of curvature R1 of the front raised surface 11 is preferably at least 0.5 mm and at most 5.0 mm; in the present embodiment, the radius of curvature R1 is set to 2.5 mm. The front raised surface 11 is not limited to a constant radius of curvature but may have at least two different radii of curvature. If the front raised surface 11 has at least two different radii of curvature, each circular arc preferably has a radius of curvature of at least 0.5 mm and at most 5.0 mm. The entire front raised surface 11 may have a radius of curvature of at least 0.5 mm and at most 5.0 mm when least square approximation is used for the calculation.

Figure 5:
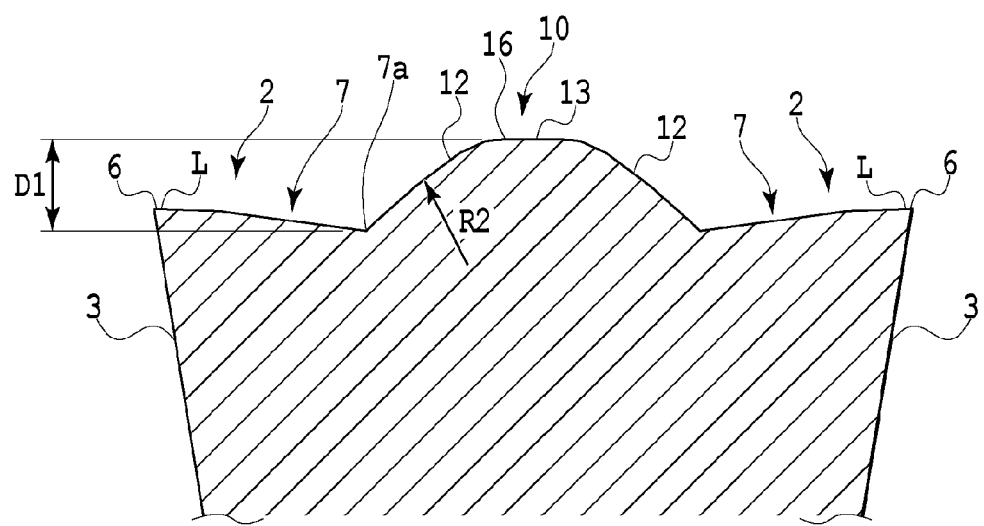
FIG. 5 is a cross-sectional view of the cutting insert taken along line V-V in FIG. 3.
Figure 6:
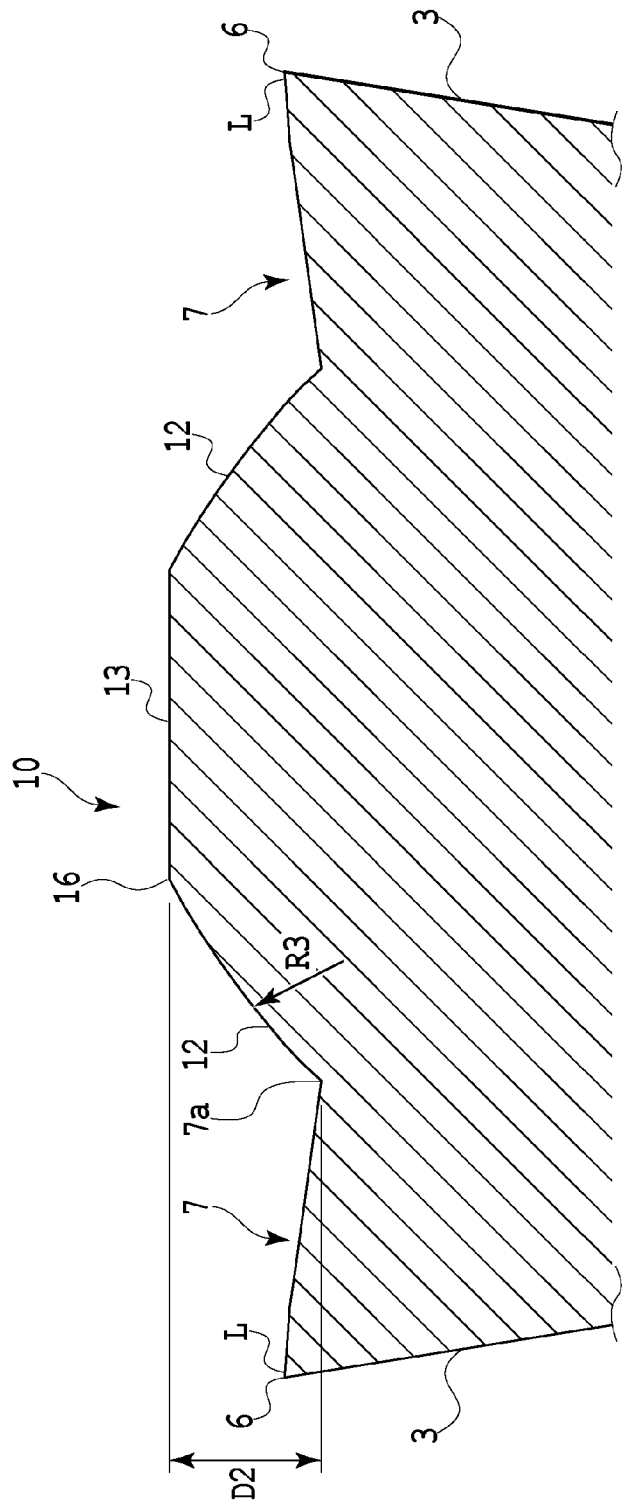
FIG. 6 is a cross-sectional view of the cutting insert taken along line VI-VI in FIG. 3.

As shown in FIG. 3, the intersecting portion 16 between the side raised surface 12 and top surface 13 of the raised portion 10 is inclined such that a distance from the corresponding side cutting edge 6 increases gradually with a distance from the corner cutting edge 5. In the present embodiment, the intersecting portion 16 is curved so as to protrude toward the corresponding side cutting edge 6 in a direction along the side cutting edge 6. Each of the side raised surfaces 12 has a curved surface shape corresponding to the intersecting portion 16 and is formed such that a distance from the corresponding side cutting edge 6 increases gradually with a distance from the corner cutting edge 5. In the present embodiment, the side raised surface 12 is curved so as to protrude in association with the intersecting portion 16. On the other hand, the side raised surface 12 is convexly curved so as to protrude upward and toward the corresponding side cutting edge 6 (outward) as seen in a cross section taken along a direction orthogonal to the bisector B, that is, a direction parallel to the straight line of the first intersecting portion 14. As illustrated in FIG. 5 and FIG. 6, the radius of curvature R3 of curved line of the side raised surface 12 in the VI-VI line end view of a portion of the side raised surface 12 which is far from the corner cutting edge 5 is greater than the radius of curvature R2 of curved line of the side raised surface 12 in the V-V line end view of a portion of the side raised surface 12 which is close to the corner cutting edge 5. Thus, the radius of curvature R2, R3 of curved line of the side raised surface 12 in a cross section orthogonal to the bisector B preferably increases gradually with the distance from the corner cutting edge 5. The radii of curvature R2 and R3 are preferably set to, for example, at least 0.5 mm and at most 5.0 mm.

For the side raised surface 12 as seen in a cross section taken orthogonally to the bisector B, the difference in height D1, D2 between an uppermost position and a lowermost position of the side raised surface 12 preferably increases gradually with the distance from the corner cutting edge 5. That is, as shown in FIG. 5 and FIG. 6, a distance from the top surface 13 of the raised portion 10 to a connection portion 7a of the chip breaker groove 7 connected to the side raised surface 12 preferably increases gradually with the distance from the corner cutting edge 5.

If the uppermost position of the side raised surface 12 is constant as in the present embodiment, the height of the lowermost position of the side raised surface 12 decreases gradually with the distance from the corner cutting edge 5. The difference in height D2 in the VI-VI line cross-sectional view (FIG. 6) of the portion of the side raised surface which is far from the corner cutting edge 5 is greater than the difference in height D1 in an the V-V line cross-sectional view (FIG. 5) of the portion of the side raised surface which is close to the corner cutting edge 5.

The transition surface 15 with a small width is formed between the front raised surface 11 and each of the side raised surfaces 12 so as to be smoothly continuous with the both raised surfaces 11 and 12 on the same tangent.

The top surface 13 of the raised portion 10 is formed of a substantially flat surface extending at a height equal to that of the boss surface 8. In a cutting insert that uses both opposite rhombic surfaces, for the seating face 4, the top surface 13, together with the boss surface 8, come into abutting contact with a bottom surface of an insert mounting seat; this is not shown in the drawings. That is, in the present embodiment, the top surface 13 forms a part of the boss surface 8.

The above-described cutting insert is loaded on a tip seat provided on the cutting tool body; this is not shown in the drawings. The seating face 4 and at least one side surface of the loaded cutting insert come into abutting contact with a bottom surface and a wall surface of the tip seat. Then, the cutting insert is removably fixed to the cutting tool body utilizing a screw member that engages with the mounting hole 9. The opposite rhombic surface is selected either as the rake face 2 or the seating face 4; this is not shown in the drawings. In a cutting insert that uses both opposite rhombic surfaces, the boss surface 8 and the top surface 13 come into abutting contact with the bottom surface of the insert mounting seat.

If the cutting tool body is an indexable turning tool, the operative rhombic surface of the cutting insert fixed to the cutting tool body which surface serves as the rake face 2 faces a cutting direction. Furthermore, one side cutting edge 6 of the pair of side cutting edges 6 extending from one of the corner cutting edges 5 of the rake face 2 is a side cutting edge that faces a feeding direction. The other cutting edge is an end cutting edge that faces a processed surface of a workpiece.

The cutting insert turns an outer peripheral surface of a workpiece fed in a direction parallel to a rotational center line of the workpiece and rotating around the rotational center line. In this case, the side cutting edge 6 serving as the side cutting edge and a part of the corner cutting edge 5 which is adjacent to the side cutting edge 6 contact the workpiece all along the depth of cut in a direction perpendicular to the rotational center line (cutting direction), and are responsible mainly for cutting. A part of the corner cutting edge 5 which is adjacent to the side cutting edge 6 serving as the end cutting edge contacts the processed surface of the workpiece and is responsible for forming the processed surface.

In the above-described cutting insert, chips from the side cutting edge flows toward the raised portion 10 while in contact with a part of the surface of the chip breaker groove 7. Thereafter, the chips having left the surface of the chip breaker groove 7 come into contact with the raised portion 10. If the depth of cut is so large that chips are generated at the corner cutting edges 5 and side cutting edges 6, the chips come into contact with a part of the surface of the chip breaker groove 7 and then with the front raised surface 11 and side raised surfaces 12 of the raised portion 10. Each of the side raised surfaces 12 is formed like a protruding curved surface inclined such that the distance from the corresponding side cutting edge 6 increases consistently with the distance from the corner cutting edge 5 in the direction along the side cutting edge 6, and thus the distance from the side cutting edge 6 to the side raised surface 12 increases progressively with the depth of cut. Consequently, the chips are deformed before brushing the entire the side raised surface 12 and quickly leave the side raised surface 12. This prevents excessive contact between the side raised surface 12 and the chips. As a result, adhesion of the chips to the side raised surface 12 and scatter of the chips are suppressed. Furthermore, a possible increase in cutting resistance is prevented.

Moreover, the side raised surface 12 is curved so as to protrude outward as seen in a cross section taken orthogonally to the bisector B. This shape of the side raised surface 12 contributes, at a high feed rate, to allowing the chips to quickly leave the side raised surface 12 to prevent possible excessive contact between the side raised surface 12 and the chips. The above-described two aspects further suppress the adhesion of the chips to the side raised surface 12 and the scatter of the chips, and significantly effectively prevent a possible increase in cutting resistance.

In the case of a small depth of cut where only the corner cutting edges 5 are involved in cutting, the chips come into contact with the front raised surface 11, which faces the leading end of the corner cutting edge 5. The front raised surface 11, thanks to the large width thereof, blocks the chips from the corner cutting edge 5 and reliably controls curling of the chips. Furthermore, since the front raised surface 11 is curved so as to protrude outward as seen in a cross section taken along the above-described bisector B, even if the feed rate is increased with the small depth of cut maintained, the chips can be quickly separated from the front raised surface 11. Thus, possible excessive contact between the side raised surface 12 and the chips can be prevented. This suppresses the adhesion of the chips to the front raised surface 11 and the scatter of the chips, and allows a possible increase in cutting resistance to be prevented.

As described above, in the case of a small depth of cut where only the corner cutting edges 5 are involved in cutting, the front raised surface of the raised portion effectively improves the chip processing capability and reduces the cutting resistance. In semi-finishing and rough processing at a large depth of cut where the corner cutting edge 5 and side cutting edges 6 are involved in cutting, the side raised surfaces, in addition to the front raised surface, effectively improve the cut processing capability and reduce the cutting resistance. Moreover, the front raised surface 11 and the side raised surfaces 12 effectively prevents the scatter of the chips and reduces the cutting resistance even if the fed rate is increased. This enables stable chip processing and a reduction in cutting resistance under a wide range of cutting conditions for the depth of cut and the feed rate.

In the raised portion 10 of the cutting insert, the length W of the intersecting portion 14 between the front raised surface 11 and the top surface 13 is set equal to and smaller than the radius of curvature of the corner cutting edge 5. In the present embodiment, the length W of the intersecting portion 14 is set to 0.50 mm, which is equal to about 63% of the radius of curvature of the corner cutting edge 5, 0.8 mm. As the width of the front raised surface 11 increases consistently with the length W of the intersecting portion 14, the chips are more significantly blocked. However, the chips are prevented from being excessively blocked provided that the upper limit value of the length of the intersecting portion 14 is equal to the radius of curvature of the corner cutting edge 5. The lower limit value of the length W of the intersecting portion 14 is preferably set to 0.05 mm to ensure that the chips are reliably blocked. If the length W of the intersecting portion 14 is smaller than 0.05 mm, the effects of the present invention cannot be exerted.

The front raised surface 11 according to the present embodiment is formed so as to increase in size consistently with the distance from the corner cutting edge 5. That is, the effect of blocking the chips increases consistently with the distance from the corner cutting edge 5, in other words, the effect increases from the bottom to top of the front raised surface 11. Thus, the front raised surface 11 shaped as described above insignificantly blocks thick and rigid chips flowing downward with respect to the corner cutting edge 5 and chips resulting from a low feed rate, while significantly blocking stretchy chips flowing upward with respect to the corner cutting edge 5 and chips resulting from a high feed rate. Thus, the present embodiment can achieve chip processing that corresponding to the feeding conditions and the stretchy nature of the chips.

The difference D1, D2 in height between the uppermost position and lowermost position of the side raised surface 12 increases gradually with the distance from the corresponding corner cutting edge 5, as seen in a cross section taken orthogonally to the bisector B. In addition to this, the radius of curvature R2, R3 of the protruding curved line of the side raised surface 12 increases gradually with the distance from the corresponding corner cutting edge 5. Thus, chips resulting from semi-finishing and rough processing, which involve a large depth of cut, can be reliably brought into contact with and blocked by the side raised surface 12. A possible increase in cutting resistance can be prevented and appropriate and stable chip processing can be achieved, by the synergy between the effect of reliably blocking the chips and the effect of preventing the chips from the side raised surface 12 from being excessively blocked.

In the present embodiment, at the intersecting portion between the front raised surface 11 and each of the side raised surfaces 12, which are continuous with the respective ends of the front raised surface, the transition surface 15 with a small width is formed, which is smoothly continuous with both the front raised surface 11 and the side raised surfaces 12. Assuming that the transition surface 15 is not formed and that a corner is present at an intersecting portion between the front raised surface 11 and the side raised surface 12, chips contacting both raised surfaces 11 and 12 are deformed so as to be sharply curved by the intersecting portion as seen in a cross section taken orthogonally to the direction in which the chips flow out. Thus, the curling of the chips is prevented, thus requiring an extra force to deform the chips. However, the presence of the transition surface 15 solves this problem.

Furthermore, the side cutting edge 6 includes the inclined portion 6a, and the transition surface 15 is also formed. This stabilizes the outflow direction of the chips to improve the chip processing capability.

The side cutting edge 6 according to the present embodiment includes the inclined portion 6a with a height decreasing gradually with increasing distance from the corner cutting edge 5. This reduces a principal cutting force directed orthogonally to the rake face 2. The side cutting edge 6 also exerts the effect of passing the flow of the chips away from the corner cutting edge 5 depending on the inclination angle 1A of the inclined portion 6a. The synergy between these effects serves to further stabilize the chip processing and prevent the scatter of the chips and an increase in cutting resistance.

The present invention is not limited to the above-described embodiment. Of course, components may be added to the embodiment and any of the components of the embodiment may be changed and removed, without departing from the spirits of the present invention. Furthermore, the present invention has been described in conjunction with the cutting insert for use in turning the outer periphery of a workpiece. However, the present invention can be applied to a cutting insert for use in turning the inner periphery and end surface of the workpiece. The present invention can also be applied to a cutting insert for use in milling and drilling.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cutting insert formed of a plate-like member with a substantially polygonal outer shape and comprising:
   a rake face formed on at least one of opposite surfaces of the plate-like member;
   a flank face formed on a side surface extended between the opposite surfaces; and
   a cutting edge formed at an intersecting portion where the rake face and the flank face cross each other,
   the cutting edge comprising corner cutting edges formed at respective corner portions of the opposite surface with the rake face formed thereon and side cutting edges formed along a pair of side edge portions extending on opposite sides of each of the corner cutting edges, wherein
   a chip breaker groove is formed in the opposite surface with the rake face formed thereon and inside the corner cutting edge,
   the chip breaker groove comprises a raised portion raised upward from an interior of the chip breaker groove,
   the raised portion comprises a top surface comprising a top portion of the raised portion, a front raised surface facing the corner cutting edge and extended from the chip breaker groove to the top surface, and side raised surfaces arranged on opposite sides of the front raised portion, and the top surface crosses both the front raised surface and each of the side raised surfaces,
   a first intersecting portion at which the front raised surface and the top surface intersect with each other is linearly extended,
   a second intersecting portion at which each of the side raised surfaces and the top surface intersect with each other is extended from a corresponding one of opposite sides of the first intersecting portion and comprises a portion for which a distance from the corresponding side cutting edge increases gradually with a distance from the corner cutting edge,
   the front raised surface is curved so as to protrude outward,
   the side raised surfaces are each curved so as to protrude outward, and
   a radius of curvature of each of the side raised surfaces increases gradually with a distance from the corresponding corner cutting edge as seen in a cross section taken parallel to a straight line of the first intersecting portion and perpendicularly to the opposite surfaces.

2. The cutting insert according to claim 1, wherein the corner cutting edge is a round corner, and a length of the first intersecting portion is at least 0.05 mm and is set equal to or smaller than a radius of curvature of the corner cutting edge.

3. The cutting insert according to claim 1, wherein a connection portion connecting between the front raised surface and each of the side raised surfaces is curved so as to protrude toward the corresponding corner cutting edge.

4. The cutting insert according to claim 1, wherein a difference in height between an uppermost position and a lowermost position of each of the side raised surfaces increases gradually with a distance from the corresponding corner cutting edge as seen in a cross section taken parallel to a straight line of the first intersecting portion and perpendicularly to the opposite surfaces.

5. The cutting insert according to claim 1, wherein each of the side cutting edges comprises an inclined portion with a height decreasing gradually with a distance from the corresponding corner cutting edge.

6. The cutting insert according to claim 1, wherein a transition surface is formed between the front raised surface and each of the side raised surfaces, the transition surface is curved so as to protrude toward the corresponding corner cutting edge.

7. The cutting insert according to claim 1, wherein a radius of curvature of the side raised surface in a first cross section is greater than a radius of curvature of the side raised surface in a second cross section, the first and second cross sections are perpendicular to a bisector of the pair of side edge portions and to the opposite surfaces, and the first cross section is closer to the corner cutting edge than the second cross section.

8. The cutting insert according to claim 1, wherein a width of the front raised surface viewed from a side of the rake face gradually increases with distance from the corner cutting edge.

9. A cutting insert formed of a plate-like member with a substantially polygonal outer shape having a plurality of corner portions, the cutting insert comprising:
   opposing upper and lower surfaces connected by a peripheral side surface;
   a rake face formed on at least the upper surface;
   a flank face formed on the peripheral side surface between the upper and lower surfaces;
   a first cutting edge formed at an intersection of the rake face and flank face at the upper surface at a first of the plurality of corner portions, the first cutting edge comprising a corner cutting edge having a bisector (B) and side cutting edges extending on either side of the corner cutting edge;
   a chip breaker groove formed in the upper surface inside the cutting edge; and
   a raised portion rising upward from an interior of the chip breaker groove, the raised portion comprising:
   a top surface comprising a top portion of the raised portion;
   a front raised surface facing the corner cutting edge and extending from the chip breaker groove to the top surface; and
   side raised surfaces arranged on opposite sides of the front raised portion; wherein:
   the top surface intersects the front raised surface at a first intersecting portion which extends in a direction perpendicular to the bisector (B);
   the top surface intersects each of the side raised surfaces at a second intersecting portion) which extends from a corresponding one of opposite sides of the first intersecting portion and comprises a portion for which a distance from the corresponding side cutting edge increases gradually with a distance from the corner cutting edge;
   the front raised surface is convexly curved in a cross section taken along the bisector (B);
   the side raised surfaces are each convexly curved in a cross section taken orthogonal to the bisector (B), and
   a radius of curvature of each of the side raised surfaces increases gradually with a distance from the corresponding corner cutting edge as seen in a cross section taken orthogonal to the bisector (B).

10. The cutting insert according to claim 9, wherein the corner cutting edge is a round corner, and a length of the first intersecting portion is at least 0.05 mm and is set equal to or smaller than a radius of curvature of the corner cutting edge.

11. The cutting insert according to claim 9, wherein a connection portion connecting between the front raised surface and each of the side raised surfaces is curved so as to protrude toward the corresponding corner cutting edge.

12. The cutting insert according to claim 9, wherein a difference in height between an uppermost position and a lowermost position of each of the side raised surfaces increases gradually with a distance from the corresponding corner cutting edge as seen in a cross section taken orthogonal to the bisector (B).

13. The cutting insert according to claim 9, wherein each of the side cutting edges comprises an inclined portion with a height decreasing gradually with a distance from the corresponding corner cutting edge.

14. The cutting insert according to claim 9, wherein a transition surface is formed between the front raised surface and each of the side raised surfaces, the transition surface is convexly curved.

15. The cutting insert according to claim 9, wherein a radius of curvature of the side raised surface in a first cross section is greater than a radius of curvature of the side raised surface in a second cross section, the first and second cross sections are perpendicular to the bisector (B), and the first cross section is closer to the corner cutting edge than the second cross section.

16. The cutting insert according to claim 9, wherein a width of the front raised surface in a top view of the upper surface gradually increases with distance from the corner cutting edge.

17. The cutting insert according to claim 9, wherein:
   the cutting insert is double-sided with the upper and lower surfaces both being provided with cutting edges.

18. The cutting insert according to claim 17, wherein:
   top surface of the raised portion forms a part of a boss surface which surrounds a mounting hole of the insert, the boss surface configured to serve as a seating surface of the insert.

* * * * *